Patented May 25, 1926.

1,586,045

UNITED STATES PATENT OFFICE.

ZENOS P. ROMERILL, OF OGDEN, UTAH.

PLASTIC COMPOSITION.

No Drawing.  Application filed October 2, 1923. Serial No. 666,187.

This invention relates to a plastic or cementitious composition.

It is aimed to provide generally a more efficient composition particularly adapted for use to afford a finishing surface for floors, ceilings and walls of all classes of buildings and the like where marble, stone, tile, metal, wood and similar products are now used.

A particular aim is to provide such a composition as will be exceedingly light in weight, will be fire-proof, will have efficient adhesive qualities, will not crack incidental to drying, and which will be highly sanitary.

In the composition, I use calcined magnesite, a mixture of disintegrated or weathered silicious and calcareous rock with vegetable matter intermixed, silica, ochre, ordinary wood sawdust, rubber, and chloride of magnesium.

The ingredients specified as a mixture of disintegrated or weathered silicious and calcareous rock with vegetable matter intermixed is a natural product which is mined from a bed or natural deposit in the State of Utah.

In the preparation of the composition, I prefer to use the ingredients in about the following proportions and conditions:—

Magnesite (calcined), preferably powdered, 42 pounds; mixture of disintegrated or weathered silicious and calcareous rock with a vegetable matter intermixed, in disintegrated or powdered form, 33⅓ pounds; silica, preferably powdered, 5 pounds; ochre, 5 pounds; calcite, 5 pounds; ordinary wood saw-dust, 6 pounds; rubber, preferably powdered, 5 pounds; 20% Baumé solution of chloride of magnesium (which may be crude) specific gravity 20, 10 gallons.

A filler other than the ordinary or common wood saw-dust specified may be used, but the saw-dust is preferred in view of its lightness.

Ochre may be dispensed with as it is primarily used as a coloring agent.

The rubber may also be dispensed with.

The proportions of the different ingredients may be varied, preferably within the following limits:—

Magnesite (calcined), 10 to 60 pounds; mixture of disintegrated or weathered silicious and calcareous rock with a vegetable matter intermixed, 10 to 50 pounds; silica, 2 to 25 pounds; ochre, 3 to 25 pounds; calcite, 2 to 20 pounds; common wood saw-dust, 3 to 35 pounds; rubber, 1 to 25 pounds; 17% to 20% Baumé crude solution of chloride of magnesium from 10 to 35 specific gravity, 2 to 25 gallons.

I claim as my invention:—

A plastic composition consisting of the following ingredients in substantially the proportions stated: powdered magnesite (calcined), 42 pounds; a natural product of weathered silicious and calcareous rock with vegetable matter intermixed, 33⅓ pounds powdered silica, 5 pounds; ochre, 5 pounds; calcite 5 pounds; wood saw-dust, 6 pounds; powdered rubber, 5 pounds; and 2 gallons of 20% crude solution of chloride of magnesium.

In testimony whereof I have affixed my signature.

ZENOS P. ROMERILL.